I. L. LINDHEIM.
EDUCATIONAL DEVICE.
APPLICATION FILED SEPT. 9, 1913.

1,245,475.

Patented Nov. 6, 1917.
2 SHEETS—SHEET 1.

Witnesses:

Inventor
Irma L. Lindheim
By her Attorneys

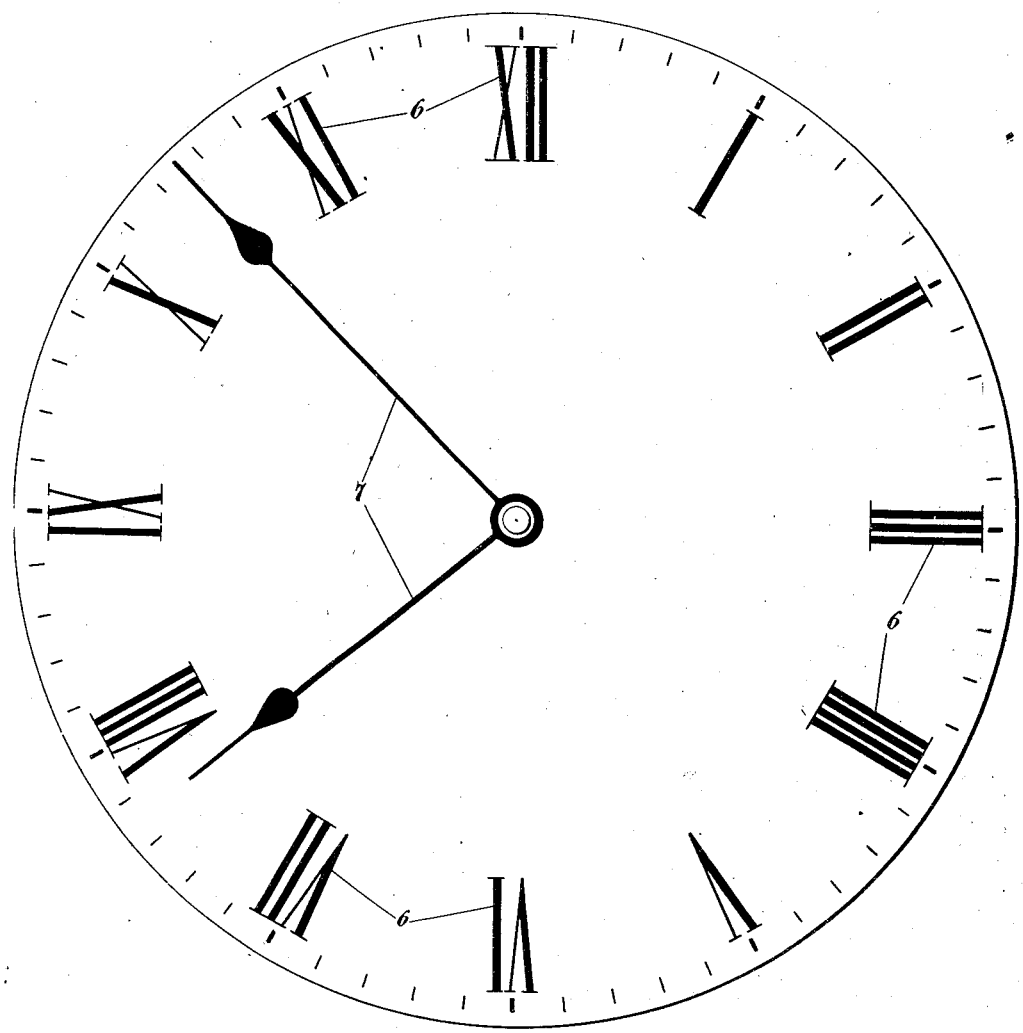

UNITED STATES PATENT OFFICE.

IRMA L. LINDHEIM, OF NEW YORK, N. Y.

EDUCATIONAL DEVICE.

1,245,475.   Specification of Letters Patent.   Patented Nov. 6, 1917.

Application filed September 9, 1913. Serial No. 788,789.

*To all whom it may concern:*

Be it known that I, IRMA L. LINDHEIM, of New York, in the county of New York, and in the State of New York, have invented a certain new and useful Improvement in Educational Devices, and do hereby declare that the following is a full, clear, and exact description thereof.

My invention relates particularly to educational devices for teaching young children. It relates more particularly, however, to appliances used for teaching children prior to the time when they have learned to read and write.

The object of my invention is to provide an apparatus of the kind referred to which will quickly and readily teach young children the alphabet, simple words, numerals, and which will educate their perceptions and their judgment, so that by the use of the same young children will become much more rapidly instructed than by the use of former appliances used for instructing young children.

While my invention is capable of being carried out in many different ways, for the purpose of illustration, I have shown only one form of my invention in the accompanying drawings in which—

Fig. 4 is a plan view of a plate or chart showing a clock having removable characters such as numbers.

Figure 1:
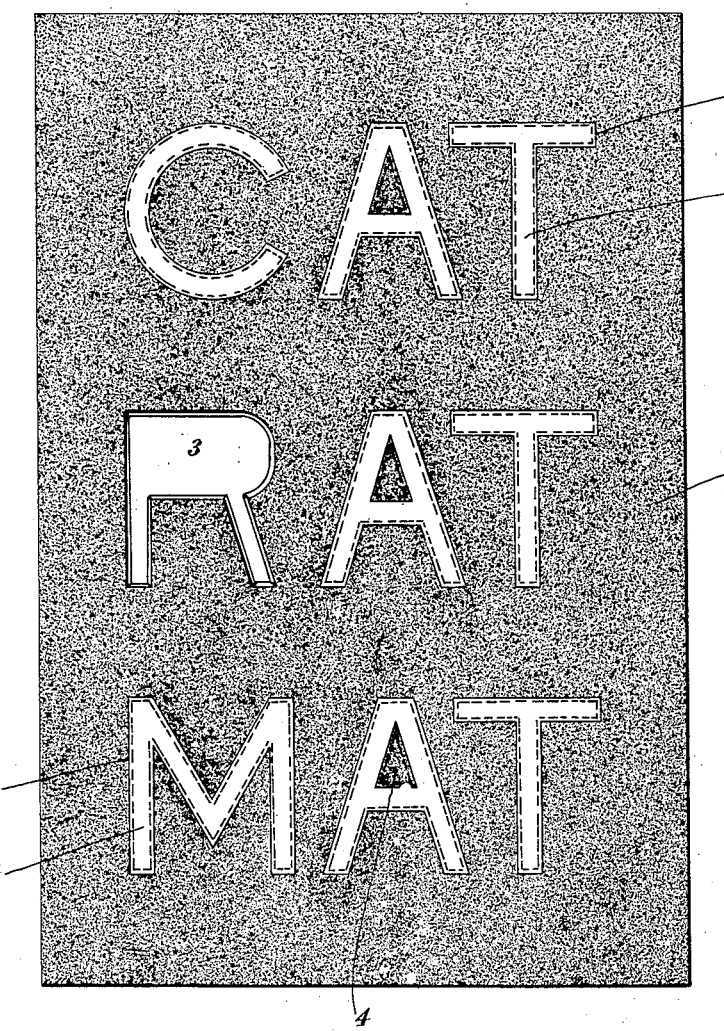
Figure 1 is a plan view of a plate or chart made in accordance with my invention.
Figure 2:
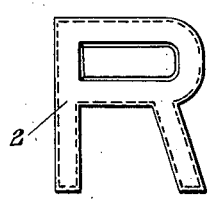
Fig. 2 is a plan view of one of the removable characters taken from the plate or chart shown in Fig. 1.
Figure 3:
Fig. 3 is a plan view of one of the removable inserts taken from the center of the character shown in Fig. 2.

In the drawings I have shown a plate or chart 1 made of any suitable material such as, for example, cardboard, said plate or chart being provided with a plurality of removable characters 2 which are, in this instance, letters of the alphabet carried in correspondingly shaped recesses 3 which extend entirely through the plate or chart 1. If desired, the recesses 3 and the characters 2 may be provided with beveled sides so as to make the characters 2 removable from only one side of the plate or chart 1. In the case where the letter contains closed lines, as for example in the letter R, the letter is also provided with a removable insert 4. Furthermore, if desired, the surface of the plate or chart 1 may be made rough while the surfaces of the characters 2 are made smooth, or vice versa, so that by this means the young child will learn to distinguish between the perceptions rough and smooth. Again, if so desired, the plate or chart 1 and the characters 2 may be made with surfaces having different colors so that the surface of the character may be readily distinguished from the surface of the plate or chart 1 when the characters have been placed in the recesses 3. While the plate or chart 1, as previously set forth, has been provided with letters 2 of the alphabet, which in fact indicate simple words, it is to be understood that, of course, the letters may, if desired, be arranged in any desired way, either to teach the child the individual letters of the alphabet or to spell any desired word. Furthermore, it is to be understood that the numerals may be taught in the same way and that the plate or chart 1 may, of course, be provided with numerals instead of letters if desired.

In Fig. 4 I have shown a chart exhibiting a clock 5 having removable numbers 6 and hands 7 attached thereto that are adapted to turn. The numbers 6 are removable inserts similar in character to the removable inserts previously described.

In the operation of the educational device, it will be assumed that all of the letters 2 have been removed from the plate or chart 1 and that the removable inserts 4 have also been removed from the characters containing the same. The characters 2 and the inserts 4 are then mixed indiscriminately and placed before a young child and the latter is required to select the characters from the set one after another and find from a comparison of the shape of a particular character with the shape of the different recesses in the plate or chart 1 the particular recess which has a shape corresponding to the shape of the character to be inserted. The fact that the particular character is built up from a concrete body of material impresses the mind of the child with the shape and meaning of the character very much more than if the character were merely indicated by a line or lines upon paper. This result is very much facilitated by the fact that the character so constructed can be subjected to the sense of touch of the child so that the child may receive the strong impressions which flow from the running of his fingers around the edges of the particular character and also around not only the top of the corresponding recess in the plate or chart 1 but also around the rear of said recess in the rear face of the plate or chart 1. The removable inserts 4 are placed in the characters 2 by the child in the same manner, it being understood that the presence of recesses extending entirely through the plate or chart 1 materially increases the strength of the impression upon the child's mind, owing to the fact that he can determine the shape of the particular recess by perceptions received from the front and the rear of the plate or chart 1 simultaneously. By this means the shape of a particular letter or numeral is indelibly impressed upon the mind of the child and he thereby not only becomes familiar with the shape of a particular letter or numeral earlier and much more readily than by the mere sight of marks made upon paper or in a similar manner and before the child has any ability to reproduce the shapes of the letters or numerals by lines or otherwise, but he becomes simultaneously impressed with the relations of the various letters to one another whereby they may be used to make intelligible words. Again, by the use of the plate or chart 1, containing such characters, the child learns the difference between the perceptions of rough and smooth, owing to the fact that the characters 2 are provided with smooth surfaces while the plate or chart 1 has a rough surface, or vice versa. The child will also be impressed with the difference in colors owing to the fact that the characters 2 are provided with a different color than the body of the plate or chart 1. The plate or chart 1 may also be used to educate the child so as to assist in producing the results above referred to by permitting the child to remove the letters by pressure of his fingers through the recesses from the rear of the plate or chart 1. As a result, it will be found that the knowledge of the letters and numerals will not only be rapidly developed, but the sense of touch and perceptions as to size and form involving accuracy will also be developed, and that in general the judgment of the child will become rapidly trained.

The use of the chart shown in Fig. 4 is carried out in the same way as the chart previously described, except that in this instance numbers six are used instead of letters. This chart may be used for teaching a child how to tell the time. These numerals may also be used for arithmetical problems.

This whole operation of the teaching of the child may be carried out by the method of play, the child being led to look upon the plate or chart 1 and the removable characters as a simple form of game to engage his attention and delight him. The education of the child will, therefore, become in reality a source of pleasure to the child and by this means his advancement will be made much more rapid.

While I describe my invention in detail, I wish it to be understood that many changes may be made therein without departing from the spirit of my invention.

I claim:

1. A chart having a recess with beveled sides extending entirely through the same and a removable insert with beveled sides therein, the upper surfaces of the chart and inserts being in the same plane.

2. A chart having a recess with beveled sides extending entirely through the same and a removable insert with beveled sides therein, the removable insert having the same upper external contour as the upper edge of the recess.

3. A chart having a recess with beveled sides extending entirely through the same and a removable language character having beveled sides therein, said character having closed lines and having a recess with beveled sides between the closed lines extending entirely through the character, and a removable insert with beveled sides in said recess.

4. A chart having a recess with beveled sides extending entirely through the same and a removable language character having beveled sides therein, said character having closed lines and having a recess with beveled sides between the closed lines extending entirely through the character, and a removable insert with beveled sides in said recess, the upper surfaces of the chart and insert being in the same plane.

5. A chart having a recess with beveled sides extending entirely through the same and a removable language character having beveled sides therein, said character having closed lines and having a recess with beveled sides between the closed lines extending entirely through the character, and a removable insert with beveled sides in said recess, the upper surfaces of the chart and insert being in the same plane, the removable inserts having the same upper external contours as the upper edges of the recesses.

In testimony that I claim the foregoing I have hereunto set my hand.

IRMA L. LINDHEIM.

Witnesses:
SAMUEL SCHWARTZMAN,
ARTHUR WRIGHT.